(12) United States Patent
Baudry et al.

(10) Patent No.: US 12,152,903 B2
(45) Date of Patent: Nov. 26, 2024

(54) HEIGHT INDICATOR HAVING A PIECEWISE LINEAR HEIGHT SCALE

(71) Applicant: AIRBUS HELICOPTERS, Marignane (FR)

(72) Inventors: Jean-Pierre Baudry, Toulon (FR); Jeremy Blaise, Sausset-les-Pins (FR)

(73) Assignee: AIRBUS HELICOPTERS, Marignane (FR)

( * ) Notice: Subject to any disclaimer, the term of this patent is extended or adjusted under 35 U.S.C. 154(b) by 106 days.

(21) Appl. No.: 17/966,981

(22) Filed: Oct. 17, 2022

(65) Prior Publication Data

US 2023/0168107 A1     Jun. 1, 2023

(30) Foreign Application Priority Data

Nov. 29, 2021 (FR) .................................. 2112360

(51) Int. Cl.
    *G01C 23/00*      (2006.01)
    *B64D 43/00*      (2006.01)

(52) U.S. Cl.
    CPC ........... *G01C 23/005* (2013.01); *B64D 43/00* (2013.01)

(58) Field of Classification Search
    CPC .............................. G01C 23/005; B64D 43/00
    USPC ....................................................... 349/977
    See application file for complete search history.

(56) References Cited

U.S. PATENT DOCUMENTS

| | | | |
|---|---|---|---|
| 3,915,052 A | 10/1975 | Ruhl | |
| 4,146,953 A | 4/1979 | King, Jr. | |
| 5,136,301 A * | 8/1992 | Bechtold | G01C 23/00 342/121 |
| 5,359,890 A * | 11/1994 | Fulton | G01C 23/005 73/178 R |
| 6,204,779 B1 * | 3/2001 | Berlioz | G01C 23/00 73/178 R |
| 6,232,890 B1 * | 5/2001 | Berlioz | G01D 13/06 701/4 |
| 7,062,364 B2 * | 6/2006 | Maris | G01C 23/00 340/978 |

(Continued)

FOREIGN PATENT DOCUMENTS

| | | |
|---|---|---|
| EP | 3514496 A1 | 7/2019 |
| EP | 3572774 A1 | 11/2019 |

(Continued)

OTHER PUBLICATIONS

French Search Report for French Application No. FR2112360, Completed by the French Patent Office, Dated Jul. 7, 2022, 10 pages.

*Primary Examiner* — Kam Wan Ma
(74) *Attorney, Agent, or Firm* — BROOKS KUSHMAN P.C.

(57) ABSTRACT

A height indicator for an aircraft, the height indicator being provided with a controller controlling a display means to display a height scale and a pointer. The height scale is able to move in relation to the pointer along an axis on the display means, the height scale being a piecewise linear scale comprising several graduated sections, each graduated section having its own linear scale, each graduated section having a scale factor different from a scale factor of another graduated section, each scale factor representing the quotient between a distance on the graduated section along axis and a corresponding actual height.

20 Claims, 7 Drawing Sheets

(56) References Cited

U.S. PATENT DOCUMENTS

| | | | | |
|---|---|---|---|---|
| 7,626,515 B1* | 12/2009 | Langner | ............... | G01C 23/00 |
| | | | | 340/979 |
| 2004/0113816 A1* | 6/2004 | Maris | ................ | G01C 23/00 |
| | | | | 340/971 |
| 2016/0107766 A1* | 4/2016 | He | ..................... | G01C 23/00 |
| | | | | 701/16 |
| 2019/0360805 A1 | 11/2019 | Salesse-Lavergne | | |

FOREIGN PATENT DOCUMENTS

| | | |
|---|---|---|
| FR | 2770904 A1 | 5/1999 |
| WO | 200431833 A2 | 4/2004 |
| WO | 200534368 A2 | 4/2005 |
| WO | 2019155245 A1 | 8/2019 |

* cited by examiner

HEIGHT INDICATOR HAVING A PIECEWISE LINEAR HEIGHT SCALE

CROSS REFERENCE TO RELATED APPLICATIONS

This application claims priority to French patent application No. FR 2112360 filed on Nov. 29, 2021, the disclosure of which is incorporated in its entirety by reference herein.

TECHNICAL FIELD

The present disclosure relates to a height indicator having a height scale that is piecewise linear, and an aircraft provided with such an indicator.

BACKGROUND

A pilot of an aircraft monitors the height of the aircraft in relation to the ground, in particular when the aircraft is close to the ground and/or obstacles.

For this purpose, an aircraft is usually provided with an indicator providing the height of this aircraft.

An indicator may possibly display, on a given page, symbols indicating the vertical speed and symbols indicating the height. This page may be displayed on a screen, which may be a multifunction screen, a visor of a helmet, a head-up collimator or the like.

Moreover, alerts may be generated when threshold heights are passed. According to a first example, passing below a first threshold height may be signalled during an approach, before landing. Such a first height is sometimes referred to as the "designation height". According to a second example, passing below a second threshold height may be signalled during a mission. Such a second height is sometimes referred to as the "tactical designation height" and may be greater than the first threshold height.

According to another aspect, the height may be measured in various ways. The height may be measured via a radar sensor referred to as a "radio altimeter", from a terrain database coupled with a position obtained using a satellite positioning system, or indeed via a pressure altimeter. A radio altimeter is effective near the ground but decreases in accuracy as the height increases.

Document WO200431833 describes a method and a device for displaying a dynamic parameter of an aircraft. The device comprises a display device, which receives a display signal and displays a scale that varies in a dynamic and non-linear manner in accordance with a selected display algorithm, together with a minimum dynamic parameter value and a maximum dynamic parameter value. The display device also has a pointer pointing towards this scale.

Document WO200534368 describes a graphic display of a non-linear scale in order to have a visual appearance which imitates a mechanical drum gauge. The non-linear scale may be used to display the flight parameters of an aircraft, such as the airspeed, the altitude, the heading, and other flight parameters that can be displayed on a non-linear scale. One example of an altitude indicator has major graduations every 100 meters and minor ones every 20 meters.

Documents U.S. Pat. No. 3,915,052 A1, U.S. Pat. No. 4,146,953 A and WO 2019/155245 A1 are also known.

SUMMARY

An object of the present disclosure is therefore to propose an innovative height indicator that tends to facilitate the work of a pilot.

The present disclosure thus relates to a height indicator for an aircraft, said height indicator being provided with a controller controlling a display means, said controller and said display means being configured to display a height scale and a pointer.

The height scale is able to move in relation to the pointer along an axis on said display means, said height scale being a piecewise linear scale, said piecewise linear scale comprising several graduated sections provided with graduations, each graduated section having its own linear scale, each graduated section having a scale factor different from a scale factor of another graduated section, i.e., different from at least one other scale factor of one graduated section or indeed from several or even all the other scale factors of the other graduated sections, each scale factor representing the quotient between a distance on said graduated section along said axis and a corresponding actual height.

The term "height" may denote a height as such, i.e., the distance separating the aircraft from the overflown surface, or an altitude.

Therefore, the height scale has a plurality of graduated sections each having a linear scale. The scale factor of a graduated section is constant along the entire length of this graduated section. However, this scale factor is different for two different graduated sections.

The expression "current height" denotes a height of the aircraft at each instant.

Therefore, the controller and the display means of an object are configured to move the height scale relative to the pointer when the current height of the object changes. The controller and the display means of an object are configured to position the pointer opposite a height corresponding to the current height on the height scale.

Therefore, for a given vertical speed of the aircraft, the height scale scrolls on the display means at a scrolling speed that varies depending on the graduated section displayed.

The difference in scale factor between two graduated sections may be configured so as to be sufficiently high to create a delta of scrolling speed of the sections in question in order to alert a pilot. A multiplier of between 2 and 5 between these scale factors is advantageous, for example, in order for the pilot to be able to visually detect the difference in movement.

When undertaking a climb phase, the pilot is warned that the aircraft is moving further and further away from the ground. The pilot may possibly be able to deduce from this that the aircraft is passing certain thresholds, each threshold being associated with the boundary between two graduated sections, for example in the case of an automatic take-off procedure following a predetermined path.

When undertaking a descent phase, these scrolling jumps alert the pilot in sudden bursts to the ever-increasing proximity of the ground. The pilot is thus alerted that it may be wise to reduce the vertical speed of the aircraft in order to land in good conditions.

Each graduated section may be dedicated to and optimized for a specific operational phase. For example, graduated sections may be configured to have scrolling speeds that are optimized for transient climb/descent flight phases (scale factor for fast scrolling) and graduated sections that scroll over a longer period of time (scale factor for slow scrolling for a level flight phase or hovering flight, etc.).

A pilot can therefore easily identify the transition from one range of heights to another range of heights, simply by noting a change in the scrolling speed of the scale. Without even looking at the possible numerical symbols, the pilot can assess which height section the aircraft is in.

Moreover, the scrolling of the graduated sections in relation to the pointer is also an indicator of the vertical speed of the aircraft. The particular shape of the graduated sections makes it possible not only to provide an indication of the height of the aircraft but also gives the pilot a visual indication of the vertical speed of the aircraft.

The scrolling speed may increase when the graduated sections opposite the pointer change, when approaching the overflown surface. Thus, the scale factor of the graduated sections may be established in such a way as to encourage the pilot to reduce the vertical speed as the aircraft approaches the ground.

The height indicator may also comprise one or more of the following features, taken individually or in combination.

According to one possibility, said height scale may be able to move in translation on said display means, only a part of said height scale comprising a current height being displayed at each instant on the display means.

Only a part of the scale as a whole is displayed on the display means. The height scale is, for example, displayed in a first zone of the display means. According to one example, this first zone is contained in a rectangular display window with predefined dimensions.

The height scale may be moved in translation along a vertical or horizontal axis. Conversely, the pointer is stationary.

According to one possibility compatible with the preceding possibility, the pointer may be Y-shaped. The pointer then has one common branch extended by two inclined branches. The common branch is pointed towards the height scale, the controller positioning the height scale opposite the pointer in order to position the part of the height scale corresponding to the current height opposite the common branch.

According to one possibility compatible with the preceding possibilities, said several graduated sections may comprise a low-height section having a first scale factor, the low-height section ranging from a reference height to a first height greater than the reference height, said several graduated sections comprising an intermediate-height section having a second scale factor, the second scale factor being less than the first scale factor, the intermediate-height section ranging from the first height to a second height greater than the first height.

The reference height may be a zero height, in particular when it is a height as such and not an altitude.

This feature provides the most precise height information when the aircraft is close to the overflown surface.

The low-height section has high sensitivity and tends to scroll faster in relation to the pointer than the other graduated sections for a given vertical speed of the aircraft, which naturally encourages the pilot to slow the aircraft's descent close to the ground.

Moreover, the height scale is therefore expanded the most at the low-height section, i.e., in a height range for which a height sensor may be very precise. The height indicator may therefore be more precise in a section for which the height sensor is also the most precise.

Outside the low-height section, the height scale may be less precise because the height sensor is less precise and the pilot requires a lower level of precision in order to ensure the safety of the flight.

A low interval between two successive graduations of the low-height section may possibly represent an actual low height, and an intermediate interval between two successive graduations of the intermediate-height section represents an actual intermediate height that is greater than the actual low height.

Each graduated section may be distinguished by a set of graduations that is unique to it, in particular with regard to the interval separating two successive graduations of this section.

A pilot may therefore easily identify the displayed graduated section and, consequently, which range of heights the aircraft is in.

According to one possibility compatible with the preceding possibilities, one or indeed each graduated section may comprise graduations of two types, namely markers each provided with a short segment and markers each having a long segment.

For example, the low-height section may comprise major and minor markers, the intermediate-height section having short and long markers, the short markers being shaped differently to the minor markers.

The minor markers may be shorter than the short markers in order to visually differentiate the graduated sections.

According to one possibility compatible with the preceding possibilities, said several graduated sections may comprise a high-height section having a third scale factor, the high-height section ranging from the second height to a third height, the third scale factor being less than the second scale factor, the second height being less than the third height.

The multiplier between the third scale factor and the second scale factor may be greater than the multiplier between the second scale factor and the first scale factor. For example, the ratio between the third scale factor and the second scale factor may be in the region of 4 in order to alert the pilot of a change in operational mode (transition from a cruising phase to a descent phase or from a climb phase to a cruising phase). However, the multiplier between the second scale factor and the first scale factor may be lower and, for example, equal to 2, possibly in order to alert the pilot of the need to slow down in a given operational descent phase.

The high-height section represents a lower-precision section. The scrolling speed of this high-height section may be slower than for the low-height section and the intermediate-height section, for a given vertical speed of the aircraft, in order to declutter the height scale and also adapt it to a possible loss of precision of a height sensor.

According to one possibility compatible with the preceding possibilities, an intermediate interval between two successive graduations of the intermediate-height section representing an actual intermediate height, a high interval between two successive graduations of the high-height section may represent an actual high height that is greater than the actual intermediate height.

The greater the height represented by the interval separating two successive graduations, the greater the current height of the aircraft.

However, the graduations of the intermediate-height section and the high-height section may be the same shape. In this case, only the graduations of the low-height section may be a different shape in order to easily indicate to the pilot that the aircraft is at a low current height.

According to one possibility compatible with the preceding possibilities, said height scale may comprise an ungraduated section beyond said third height.

In a flight envelope in which the height precision required by the pilot is no longer as important, said display means may no longer display a graduated section.

According to one possibility compatible with the preceding possibilities, said controller and said display means are configured to display a number carrying a current height opposite the pointer at least as long as said current height of the aircraft is less than a predetermined threshold.

The value of the current height is displayed opposite the pointer either at all times or as long as the aircraft is below a predetermined height.

According to one possibility compatible with the preceding possibilities, the controller and the display means may be configured to display, opposite two graduations situated to either side of the pointer, the heights corresponding to these two graduations, possibly with hysteresis in order to make them appear/disappear gradually.

For example, the height indicator displays the values of heights corresponding to the two graduations of large dimensions situated to either side of the current height, or to the two graduations directly flanking the pointer.

According to one possibility compatible with the preceding possibilities, the controller and the display means may be configured to position at least one symbol opposite the height scale, said at least one symbol being integral with the height scale, said at least one symbol comprising at least one of the following symbols: a landing decision height symbol representing a threshold landing decision height, a mission decision height symbol representing a mission height floor, an autopilot symbol representing an autopilot setpoint height.

Such an autopilot setpoint height may be a parametrised height to be reached with the aircraft during the application of a hovering autopilot mode or indeed a parametrised height to be reached with the aircraft during the application of a level flight autopilot mode.

Said landing decision height symbol may possibly vary as a function of a current height, said landing decision height symbol being a first shape when the current height is greater than the threshold landing decision height, said landing decision height symbol being a second shape when the current height is less than or equal to the threshold landing decision height.

According to one possibility compatible with the preceding possibilities, the controller and the display means may be configured to position, in a second display zone of said display means separate from a first display zone displaying said height scale: a first mark when the current height is less than the mission height floor plus a second mark when the current height is less than the threshold landing decision height.

The present disclosure also relates to an aircraft comprising at least one height indicator according to the disclosure.

The aircraft may comprise at least one height sensor connected to the height indicator.

The aircraft may possibly comprise several different height sensors.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
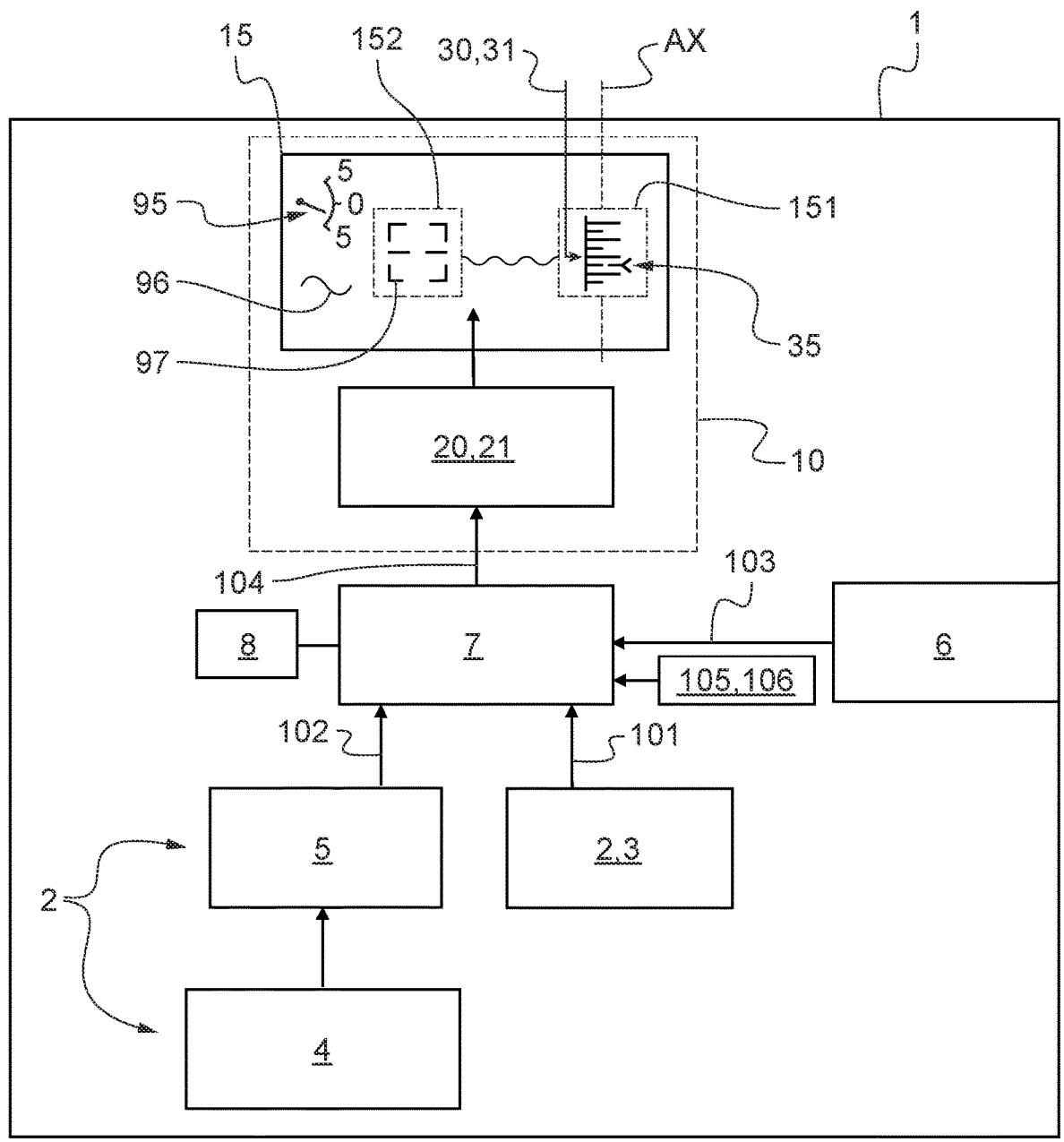
FIG. 1 is a diagram showing a height indicator according to the disclosure arranged in an aircraft.

FIG. 1 shows a height indicator 10 according to the disclosure. This height indicator 10 may be arranged within a carrier system 1, such as a vehicle and, in particular, an aircraft. The elements that are not used for the operation of the height indicator 10 are not shown here so as not to unduly clutter the figures. The height indicator 10 is configured to display information as a function of at least one display signal 104 carrying at least one current height HCUR.

The carrier system 1 may also comprise at least one height sensor 2. A height sensor 2 provides a height, i.e., a distance separating this height sensor 2 from the overflown element or an altitude. In other words, a height sensor 2 may provide an item of data relative to the vertical position of the sensor relative to the overflown element.

The expression "height sensor" is to be interpreted in the broad sense as denoting a device generating a digital or analog signal indicative of a height or an altitude, for example an electrical signal having an electrical voltage that varies as a function of the height. A height sensor may thus include at least one measurement member that generates a measurement signal, or at least one processing member that generates a signal carrying the measured height from the measurement signal.

For example, a height sensor 2 may comprise a radio altimeter 3 emitting a radio altimeter signal 101 carrying a measured current height HOUR.

Another height sensor 2 may comprise a terrain model 4 and a tracking device 5. For example, the tracking device 5 comprises a receiver of a satellite positioning system. A computer, which may be in the receiver or elsewhere, can then compile the data collected by the tracking device 5 and the terrain model 4 in order to generate a height measurement signal 102.

The term "computer" denotes a device having one or more processing units, each processing unit being able to comprise, for example, at least one processor and at least one memory, at least one integrated circuit, at least one programmable system, at least one logic circuit, these examples not limiting the scope given to the expression "processing unit". The term "processor" may refer equally to a central processing unit (CPU), a graphics processing unit (GPU), a digital signal processor (DSP), a microcontroller, etc.

The carrier system 1 may also comprise an autopilot 6 generating one or more autopilot setpoints 103. For example, the autopilot 6 may generate a setpoint height to be complied with via a human-machine interface. In particular, the autopilot 6 may control a vehicle to keep it hovering at a hovering height during the application of a hovering autopilot mode, or indeed at a level flight height during a level flight phase when applying a level flight autopilot mode.

The carrier system 1 may also comprise one or more human-machine interfaces 105, 106.

The carrier system 1 may possibly comprise a transformation computer 7 for transforming physical data into a display signal 104, for example a digital display signal, suitable for displaying symbols on the height indicator 10. The transformation computer 7 may be connected to one or more height sensors 2, to an autopilot 6, to a vertical speed sensor 8, or to the human-machine interface or interfaces 105, 106. The transformation computer 7 may be configured to determine a current height HCUR of the carrier system 1 or of the height indicator 10 depending on the data received from the height sensor or sensors 2. For example, the transformation computer 7 merges the height data from several height sensors 2. According to another example, the transformation computer 7 uses the data transmitted by the radio altimeter 3 below a particular stored height, and the data from the height sensor 2 with a terrain model 4 and tracking device 5 from and above this particular height.

Irrespective of the way in which an analog or digital display signal 104 is generated, a height indicator 10 is provided with a controller 20 controlling a display means 15.

The display means 15 may be in the form of a screen, a helmet visor, goggles, a head-up collimator, etc.

The controller 20 may comprise a symbol generator computer 21 making it possible to produce, on the display means 15, symbols carrying actual physical data, based on the information provided by the display signal or signals 104.

The symbol generator computer 21 may be a dedicated computer or a computer shared with other systems. The symbol generator computer 21 and the transformation computer 7 possibly form one and the same computer.

The symbol generator computer 21 may be integrated or remote from the display means 15.

For example, the symbol generator computer 21 may be a computer integrated into the display means 15 to form a possibly multifunction display means. According to another example, the symbol generator computer 21 may be a computer controlling the display of information on a helmet visor or another type of display means.

The various examples provided above are given by way of illustration.

Irrespective of the way in which an analog or digital display signal 104 is generated and the nature and the form of the controller 20 and the display means 15, this controller 20 and this display means 15 are configured to at least display a height scale 30 and a pointer 35. The height scale 30 may be graduated in meters or in feet, or the unit of the height scale 30 may be configurable with a standard interface of the aircraft.

For example, the display means 15 is configured to display the height scale 30 and the pointer 35 in a first display zone 151 of this display means 15. The display means 15 may be configured to display other information at least in a second display zone 152 of this display means 15, such as one or more lines 96 representing the terrain, an attitude symbol 97 of the aircraft, a variometer 95, etc.

Figure 2:
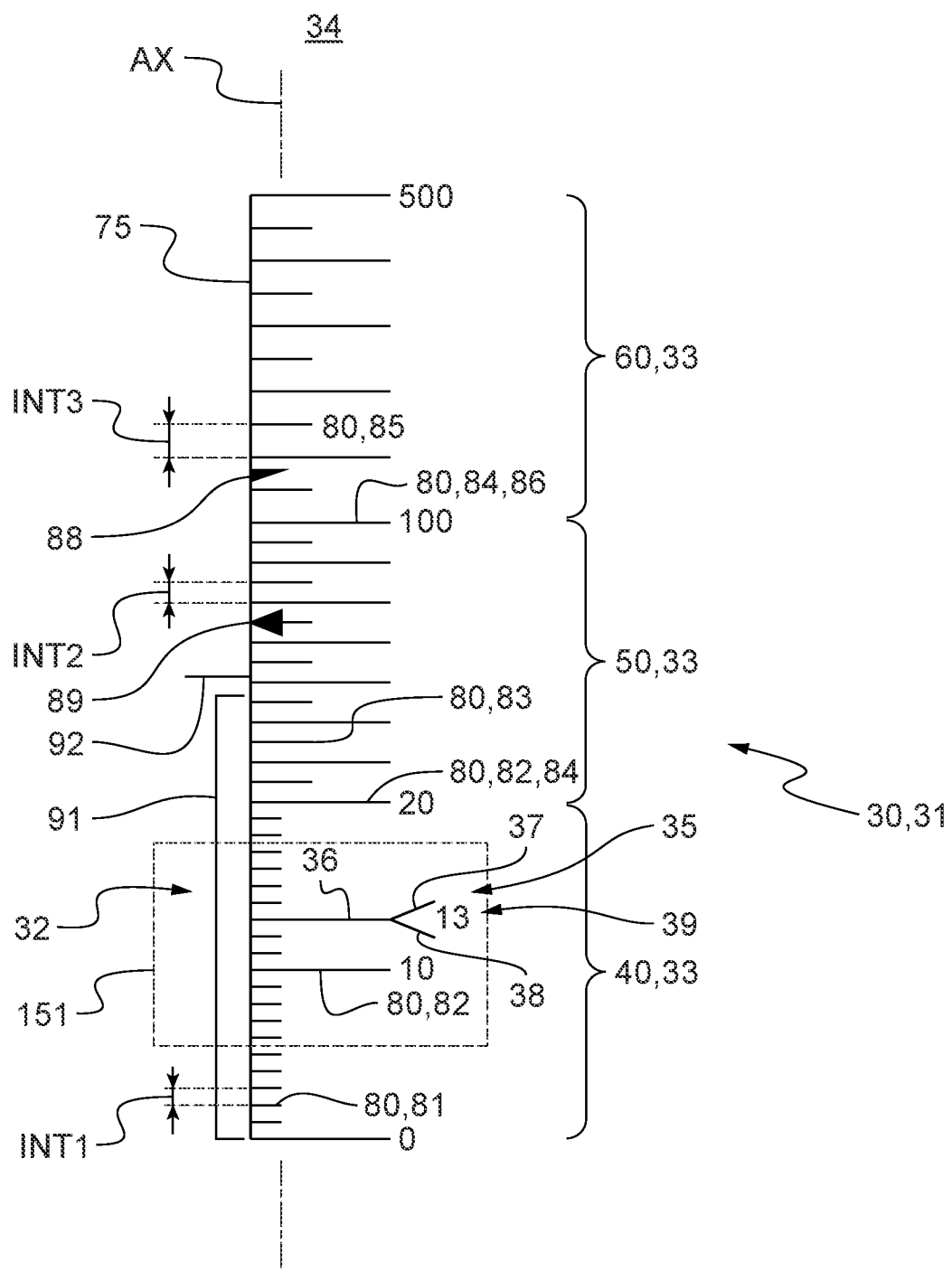
FIG. 2 is a diagram showing the height scale according to the disclosure.

FIG. 2 shows such a height scale 30 and such a pointer 35.

The height scale 30 is rendered movable in relation to the pointer 35 along an axis AX by the display means 15 and the controller 20, i.e., the height scale 30 and/or the pointer 35 can be movable on the display means 15. For example, the pointer 35 is stationary on the display means 15 whereas the controller 20 and the display means 15 are configured to move the height scale 30 along this axis AX so that the pointer 35 points to the current height HUCR on the height scale 30. In all cases, the controller 20 and the display means 15 are configured so that the pointer 35 points to a point on the height scale 30 carrying the current height HOUR. This axis AX may be a vertical axis, as seen by a pilot according to the example shown, or indeed a horizontal axis, for example.

According to the example shown, the pointer 35 may be Y-shaped. This Y shape may comprise a common branch 36 extended by two inclined branches 37, 38. The common branch 36 is then directed towards the height scale 30. The controller 20 and the display means 15 are possibly configured to display a number 39 carrying the current height HOUR opposite the pointer 35, either permanently or only when the current height HOUR is less than a stored predetermined threshold. For example, the number 39 is displayed between the inclined branches 37, 38.

The first display zone 151 is possibly configured to be able to display only a part 32 of the height scale 30. As a result, at each instant, the display means 15 is configured to display only a part 32 of the height scale containing the current height HOUR indicated by the pointer 35.

Moreover, the height scale 30 comprises several graduated sections 33 provided with graduations 80. Reference number 33 is used to refer to any graduated section, reference numbers 40, 50, 60 being used hereinafter to refer to specific graduated sections 33.

Therefore, the height scale 30 may comprise a main segment 75 carrying graduations 80.

Reference number 80 refers to any graduation. Reference numbers 81-86 refer to specific types of graduations that are explained below.

Each graduation 80 may be in the form of a segment that extends, if applicable, from the main segment 75, for example perpendicular to the main segment 75. Similarly, the possible common branch 36 of the pointer 35 may comprise a segment that extends along an axis perpendicular to the main segment 75.

Each graduated section 33 then comprises a sector of the possible main segment 75 and graduations 80. Two successive graduated sections 33 may have a common graduation, such a common graduation then being at the interface between these two graduated sections.

Moreover, the height scale 30 is a piecewise linear scale 31. Therefore, each graduated section 33 has its own linear scale, which differs from the linear scale of at least one or of each other graduated section 33.

Each graduated section 33 therefore has a scale factor different from a scale factor of each other graduated section 33. The expression "scale factor" represents, for a graduated section 33, the quotient between a distance on the graduated section 33 along said axis AX and an associated actual height. For example, the scale factor corresponds to the quotient of the distance on the graduated section 33 in question and an actual height of one foot, i.e., 0.31 meters, for example.

Moreover, the height scale 30 may comprise a graduated section 33 of the "low-height section 40" type.

The low-height section 40 covers a segment of heights ranging from a reference height H0, for example equal to zero, to a first height H1, for example in the region of 20 feet, i.e., approximately 6.1 meters. The low-height section 40 has a first scale factor. For example, an actual height of 1 foot is the equivalent of a distance of 8.5 millimeters on the display means 15, which results in a first scale factor substantially equal to 8.5 millimeters divided by one foot.

The low-height section 40 comprises multiple graduations 80. A low interval INT1 between two successive graduations 80 of the low-height section 40 represents a low actual height, for example of a value of one foot, i.e., approximately 0.31 meters.

For example, the low-height section 40 comprises graduations 80, in particular graduations of large and small dimensions, i.e., major markers 82 and minor markers 81 respectively. Each major marker 82 has a segment having a length greater than a length of segments of the minor markers 81. For example, the low-height section 40 comprises a major marker 82 every 10 feet, i.e., for example, at the reference height H0 and a height of 10 feet and a height of 20 feet, according to the illustration, and a minor marker 81 every foot between two major markers 82.

Moreover, the height scale 30 may comprise a graduated section 33 of the "intermediate-height section 50" type following the low-height section 40.

The intermediate-height section 50 covers a segment of heights ranging from the first height H1 to a second height H2, for example in the region of 100 feet, i.e., approximately 30.5 meters. The intermediate-height section 50 has a second scale factor. The second scale factor is, for example, less than the first scale factor, the first scale factor being, for example, approximately double the second scale factor.

Therefore, the low-height section 40 is more expanded than the intermediate-height section 50 in order to display a greater degree of precision at low heights. The intermediate-height section 50 is less precise both due to the precision of the height sensor or sensors 2 in the range of heights in question and insofar as the safety of the flight does not require a very high degree of precision.

For example, an actual height of 1 foot is the equivalent of a distance of 3.5 millimeters on the display means 15 in the intermediate-height section 50, which results in a second scale factor substantially equal to 3.5 millimeters divided by one foot.

The intermediate-height section 50 comprises multiple graduations 80. An intermediate interval INT2 between two successive graduations 80 of the intermediate-height section 50 represents an actual intermediate height. The actual intermediate height is greater than the actual low height, for example approximately five times the actual low height and, therefore, according to the example, a value of five feet, i.e., approximately 1.5 meters.

For example, the intermediate-height section 50 comprises graduations 80, in particular graduations of large and small dimensions, i.e., long markers 84 and short markers 83 respectively. Each long marker 84 has a length greater than a length of the short markers 83 and, for example, equal to the major markers 82. The short markers 83 may conversely have a different shape to the minor markers 81.

For example, the intermediate-height section 50 comprises a long marker 84 every 10 feet, and a short marker 83 every five feet between two long markers 84.

Moreover, the height scale 30 may comprise a graduated section 33 of the "high-height section 60" type following the intermediate-height section 50.

The high-height section 60 covers a range of heights ranging from the second height H2 to a third height H3, for example in the region of 500 feet, i.e., approximately 152.4 meters. The high-height section 60 has a third scale factor. The third scale factor is, for example, less than the second scale factor.

Therefore, the high-height section 60 is less expanded than the intermediate-height section 50, so as to keep the display decluttered in a range of heights further from the ground and therefore corresponding to less dangerous heights.

Moreover, owing to the scale factors, for a given vertical speed, the height scale 30 moves at a speed that increases when shifting from the high-height section 60 to the intermediate-height section 50 and then to the low-height section 40. In particular, for a given vertical speed of an aircraft, the height scale 30 moves at a first speed when the current height is in the high-height section 60, at a second speed greater than the first speed when the current height is in the intermediate-height section 50 and at a third speed greater than the second speed when the current height is in the low-height section 40.

For example, an actual height of 1 foot is the equivalent of a distance of 0.85 millimeters on the display means 15 in the high-height section 60, which results in a third scale factor substantially equal to 0.85 millimeter divided by a foot.

The high-height section 60 comprises multiple graduations 80. A high interval INT3 between two successive graduations 80 of the high-height section 60 represents an actual high height. The actual high height is greater than the actual intermediate height, for example in the region of ten times the actual intermediate height and, therefore, according to the example, a value of fifty feet, i.e., approximately 15.4 meters.

For example, the high-height section 60 comprises graduations 80, in particular graduations of large and small dimensions, i.e., large markers 86 and small markers 85 respectively. Each large marker 86 has a length greater than a length of the small markers 85 and, for example, equal to the major markers 82 and long markers 84. The small markers 85 may have a shape identical to the short markers 83.

For example, the high-height section 60 comprises a large marker 86 every 100 feet, and a small marker 85 half-way between two large markers 86.

Furthermore, the height scale 30 may comprise an ungraduated section 34 following the graduated sections 33 and, in particular, the high-height section 60 according to the example.

Figure 3:
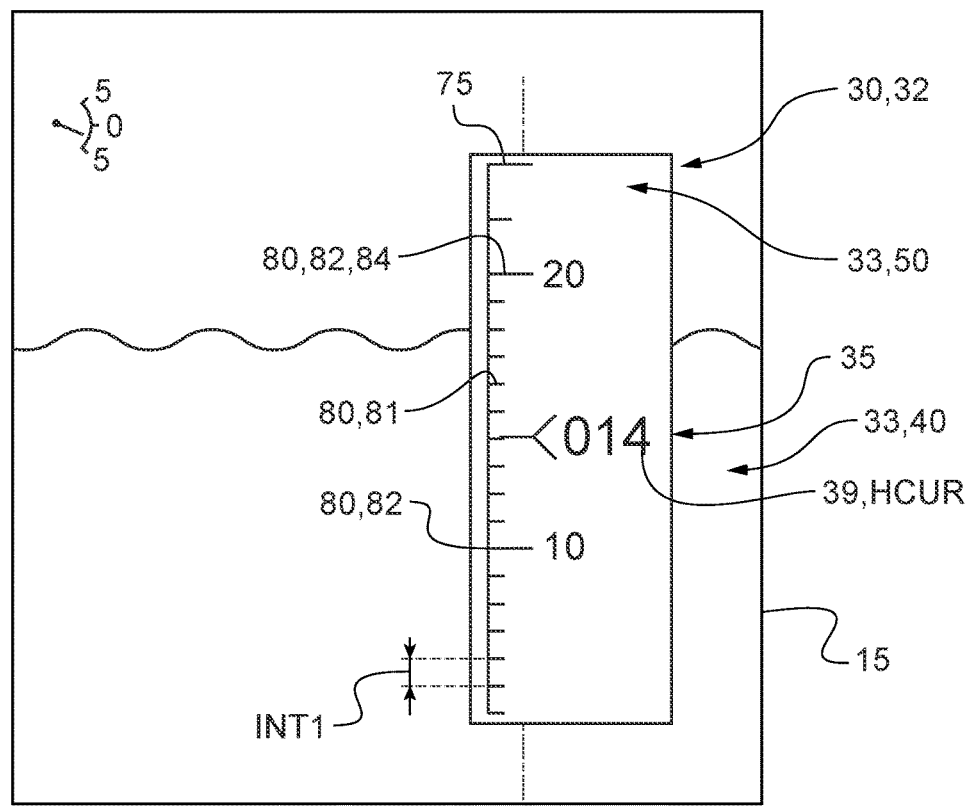
FIG. 3 is a diagram showing the display of a part of the height scale containing a low-height section.

In this context, FIG. 3 shows, diagrammatically, a height indicator 30 when the current height HCUR is situated in the low-height section 40.

Figure 4:
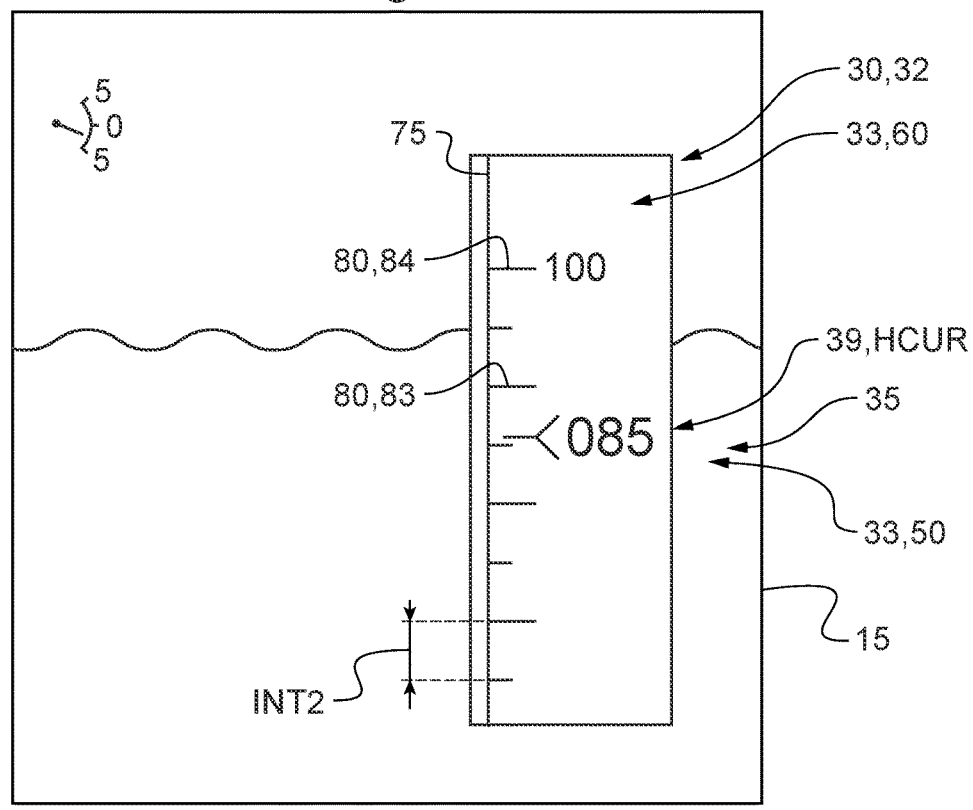
FIG. 4 is a diagram showing the display of a part of the height scale containing an intermediate-height section.

FIG. 4 shows, diagrammatically, a height indicator 30 when the current height HCUR is situated in the intermediate-height section 50.

Figure 5:
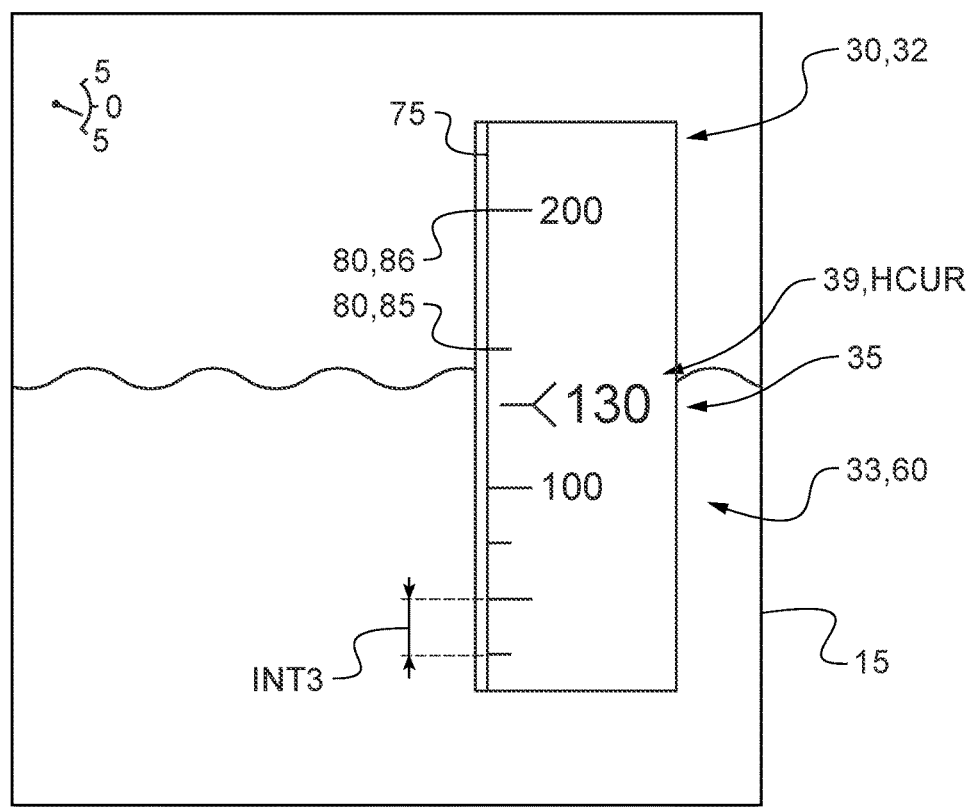
FIG. 5 is a diagram showing the display of a part of the height scale containing a high-height section.

FIG. 5 shows, diagrammatically, a height indicator 30 when the current height HCUR is situated in the high-height section 60.

Figure 6:
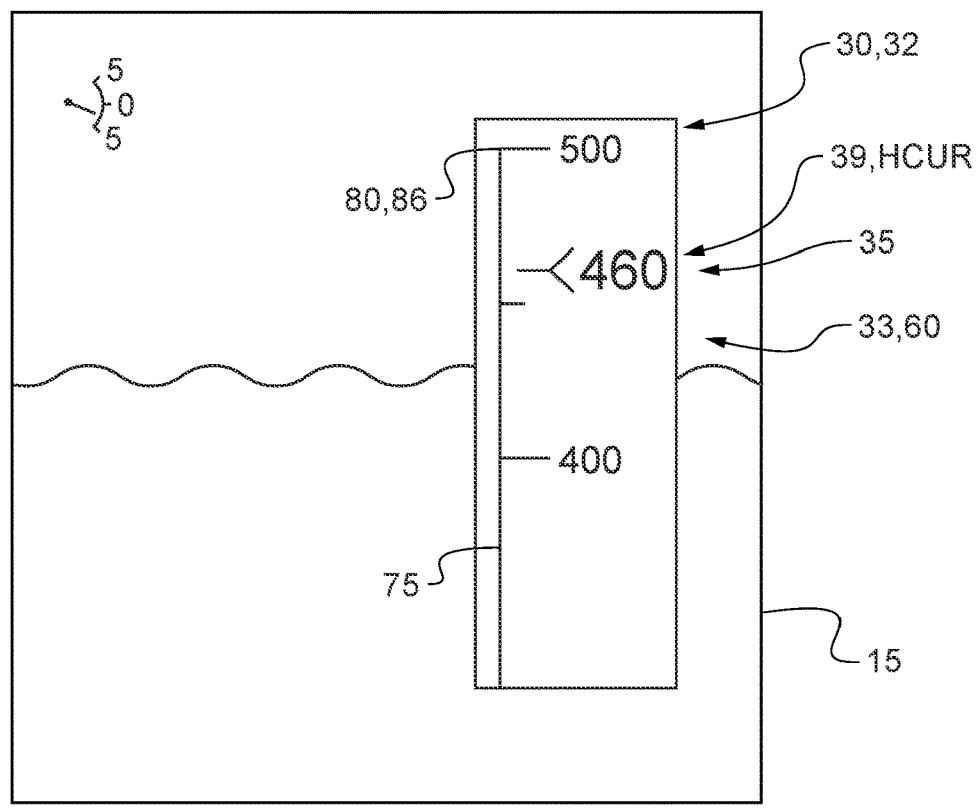
FIG. 6 is a diagram showing the display of a part of the height scale containing a high-height section close to the top of same.

FIG. 6 shows, diagrammatically, a height indicator 30 when the current height HCUR is situated in the high-height section 60, but close to one end of the graduated sections 33.

Figure 7:
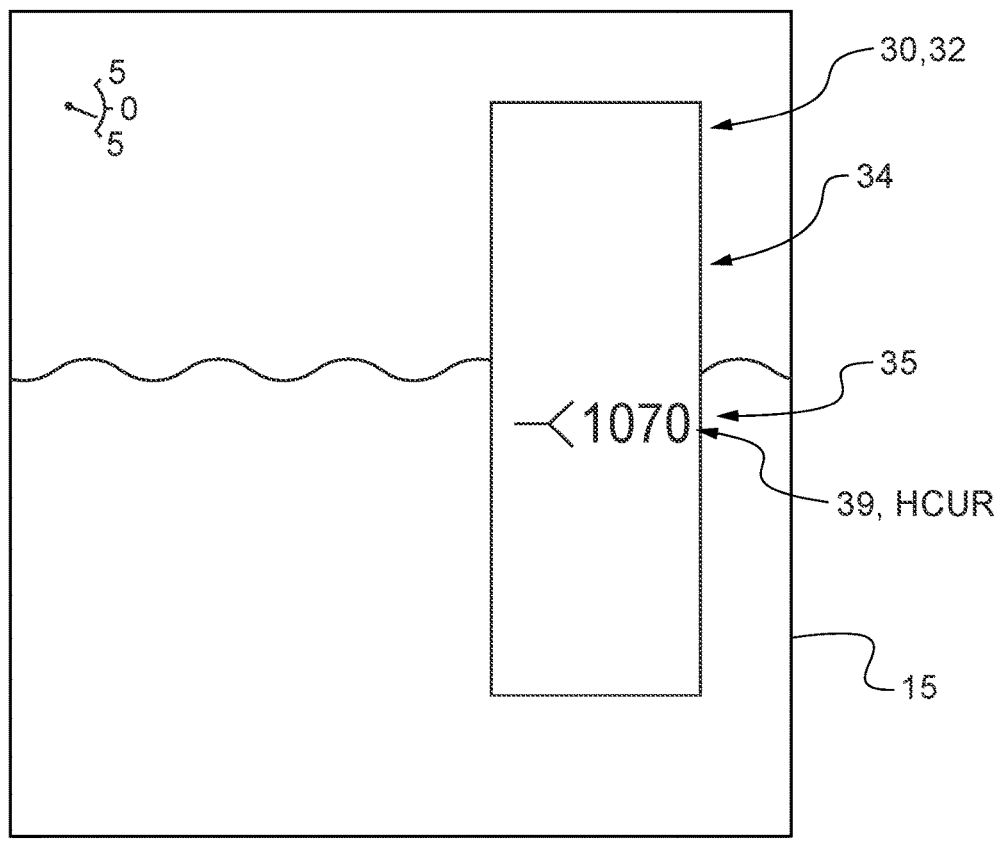
FIG. 7 is a diagram showing the display of a part of the height scale containing an ungraduated section.

FIG. 7 shows, diagrammatically, a height indicator when the current height HOUR is situated in the ungraduated section 34.

Figure 8:
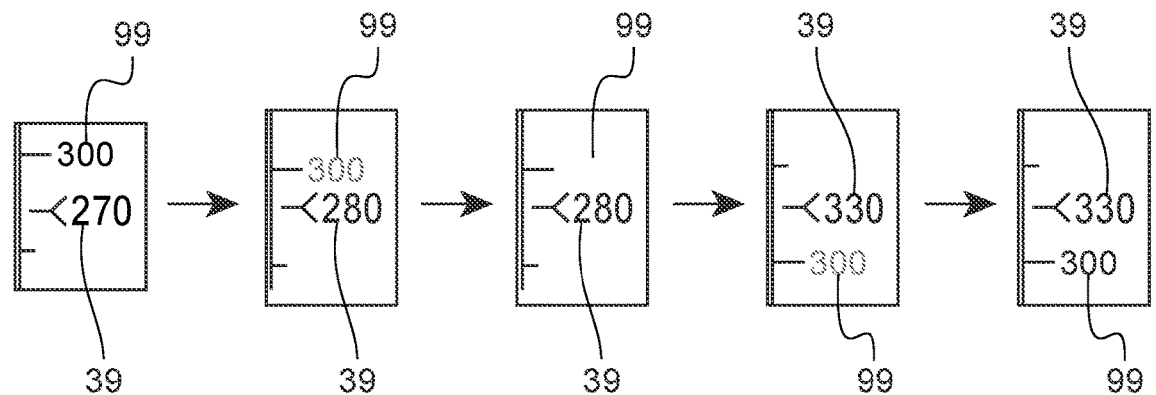
FIG. 8 is a diagram showing the progressive display of the value of a height associated with a graduation.

According to another aspect and in reference to FIG. 8, the controller 20 and the display means 15 may be configured to display height values opposite two graduations 80 situated to either side of the pointer 35, and, for example, two graduations of large dimensions 82, 84, 86 or two graduations flanking the pointer.

FIG. 8 shows the possibility of providing a progressive display of these height values arranged around the current height HOUR.

FIG. 8 therefore shows a portion of the height scale 30 displayed on the display means 15 at successive instants.

For example, the display means 15 progressively modifies the opacity of the numbers carrying the displayed heights. This opacity may change between a value of 1 in which the height in question is fully displayed and a value of zero in which the height in question is invisible.

According to a first variant, the value of the opacity Op is a function of the time when a limit is passed of type Op=1−dt/T when the number disappears and Op=dt/T when the number appears, dt being the elapsed time and T the total time before disappearance/appearance.

According to a second variant, the value of the opacity Op is a function of the distance between two values Y1, Y2 of heights of the height scale 30 according to a relation of the type Op=1−dy/(Y1−Y2) at the time of disappearance and Op=dy/(Y1−Y2) at the time of appearance, dy being the distance between said two heights on the display means 15.

Figure 9:
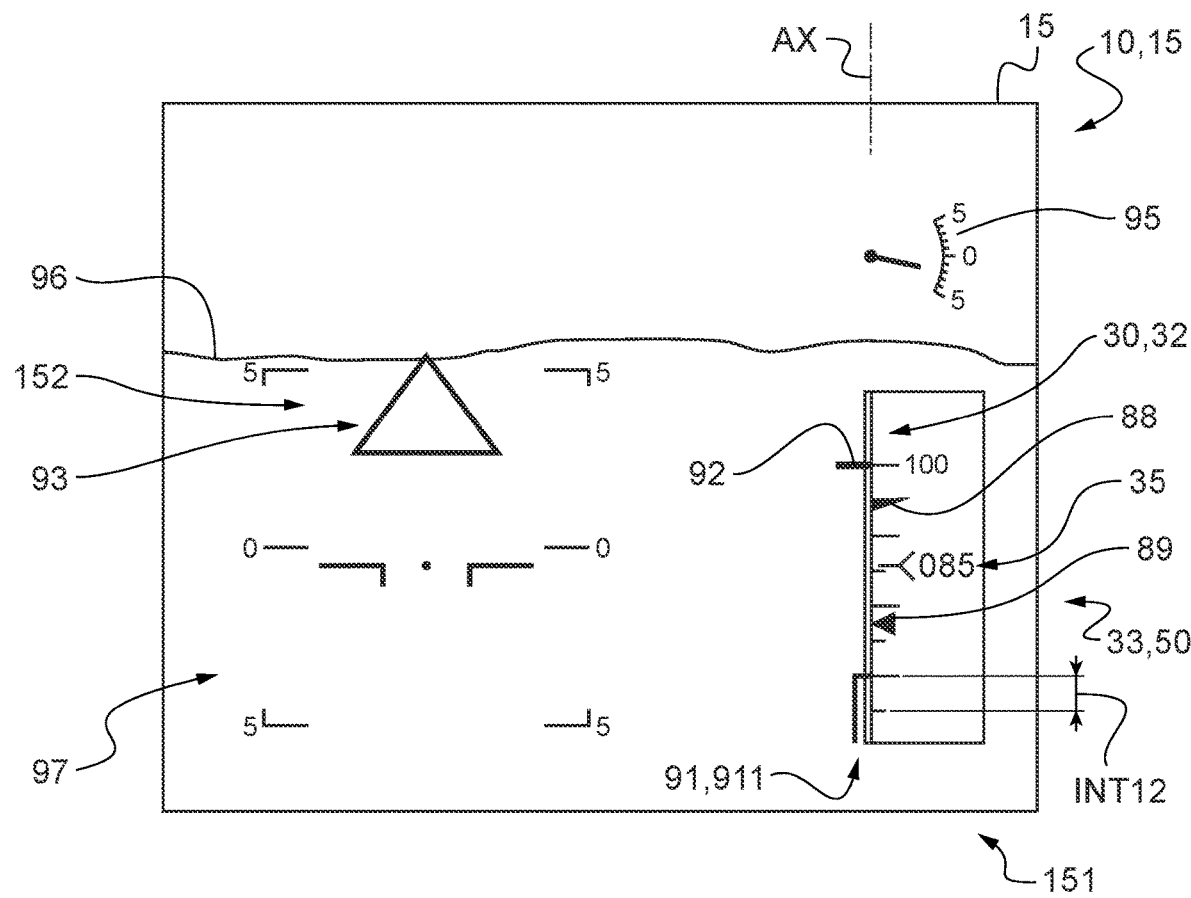
FIG. 9 is a diagram showing the display of a mark on the display means at the same time as the display of symbols of the height scale on the display means.

According to another aspect and in reference to FIG. 9, the controller 20 and the display means 15 may be configured to position one or more symbols opposite the height scale 30, each symbol being integral with the height scale 30. This symbol may be chosen from a list comprising at least one of the following symbols: a landing decision height symbol 91 representing a threshold landing decision height that is stored or can be configured with a human-machine interface 105, a mission decision height symbol 92 representing a mission height floor that is stored or can be configured with a human-machine interface 106, an autopilot symbol 88, 89 representing an autopilot setpoint height. Such an autopilot symbol may comprise a symbol 88 positioned at a hovering height or a symbol 89 positioned at a level flight height.

FIG. 9 is given by way of illustration, the various symbols being positioned randomly.

The display means 15 is possibly configured to vary the landing decision height symbol 91 depending on the current height HOUR.

Thus, the landing decision height symbol 91 may be a first shape 911 when the current height HOUR is greater than the threshold landing decision height, in particular a threshold landing decision height of 70 feet according to the example shown in FIG. 9.

In parallel, the controller 20 and said display means 15 are possibly configured to position, in the second display zone 152, a first mark 93, such as a triangle, for example, when the current height is lower than the mission height floor.

Figure 10:
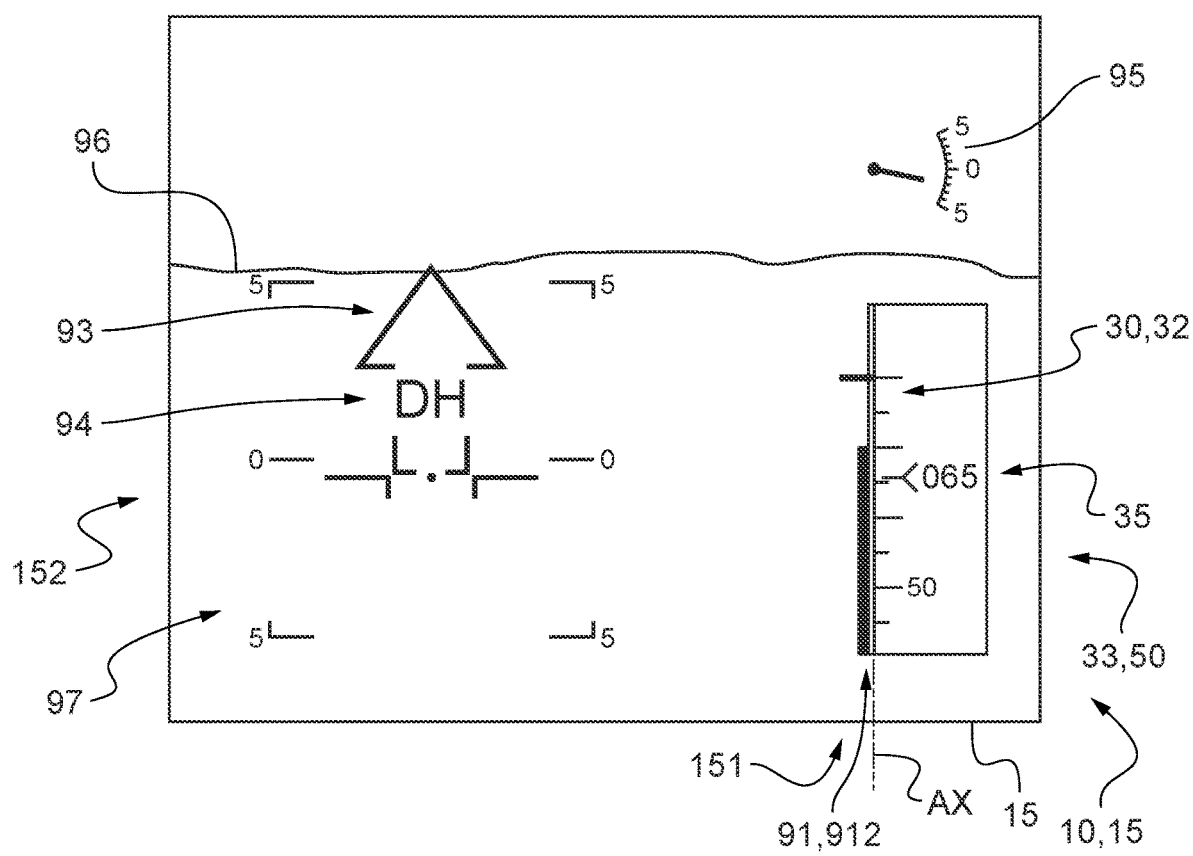
FIG. 10 is a diagram showing the display of a mark on the display means at the same time as the display of symbols of the height scale on the display means.

In reference to FIG. 10, when the current height becomes less than or equal to the threshold landing decision height, the display means 15 is configured to give the decision height symbol 91 a second shape 912.

In parallel, the controller 20 and the display means 15 are configured to position a second mark 94, in addition to the first mark 93, in the second display zone 152.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. A height indicator for an aircraft, the height indicator comprising a controller controlling a display means, the controller and the display means being configured to display a height scale and a pointer, wherein the height scale is able to move in relation to the pointer along an axis on the display means, the height scale being a piecewise linear scale, the piecewise linear scale comprising several graduated sections comprising graduations, each graduated section having its own linear scale, each graduated section having a scale factor different from a scale factor of another graduated section, each scale factor representing the quotient between a distance on the graduated section along the axis and a corresponding actual height, the several graduated sections comprising a low-height section having a first scale factor, the low-height section ranging from a reference height to a first height greater than the reference height, the several graduated sections comprising an intermediate-height section having a second scale factor, the second scale factor being less than the first scale factor, the intermediate-height section ranging from the first height to a second height greater than the first height;

wherein the low-height section comprises major markers and minor markers of the graduations, the intermediate-height section having short markers and long markers of the graduations, the short markers being shaped differently to the minor markers.

2. The height indicator according to claim 1, wherein the height scale is able to move in translation on the display means, only a part of the height scale comprising a current height being displayed at each instant on the display means.

3. The height indicator according to claim 1, wherein a low interval between two successive graduations of the low-height section represents an actual low height, and an intermediate interval between two successive graduations of the intermediate-height section represents an actual intermediate height that is greater than the actual low height.

4. The height indicator according to claim 1, wherein the several graduated sections comprise a high-height section having a third scale factor, the high-height section ranging from the second height to a third height, the third scale factor being less than the second scale factor, the second height being less than the third height.

5. The height indicator according to claim 4, wherein, an intermediate interval between two successive graduations of the intermediate-height section representing an actual intermediate height, a high interval between two successive graduations of the high-height section represents an actual high height that is greater than the actual intermediate height.

6. The height indicator according to claim 4, wherein the height scale comprises an ungraduated section beyond the third height.

7. The height indicator according to claim 1, wherein the controller and the display means are configured to display a number carrying a current height opposite the pointer at least as long as the current height of the aircraft is less than a predetermined threshold.

8. The height indicator according to claim 1,
wherein the controller and the display means are configured to display, opposite two graduations situated to either side of the pointer, the heights corresponding to these two graduations.

9. The height indicator according to claim 1,
wherein the controller and the display means are configured to position at least one symbol opposite the height scale, the at least one symbol being integral with the height scale, the at least one symbol comprising at least one of the following symbols: a landing decision height symbol representing a threshold landing decision height, a mission decision height symbol representing a mission height floor, an autopilot symbol representing an autopilot setpoint height.

10. The height indicator according to claim 9,
wherein, the at least one symbol comprising the landing decision height symbol representing a threshold landing decision height, the landing decision height symbol varies as a function of a current height, the landing decision height symbol being a first shape when the current height is greater than the threshold landing decision height, the landing decision height symbol being a second shape when the current height is less than or equal to the threshold landing decision height.

11. The height indicator according to claim 9,
wherein, the at least one symbol comprising the landing decision height symbol representing a threshold landing decision height and the mission decision height symbol representing a mission height floor, the controller and the display means are configured to position, in a second display zone of the display means separate from a first display zone displaying the height scale: a first mark when the current height is less than the mission height floor, and the first mark plus a second mark when the current height is less than the threshold landing decision height.

12. An aircraft comprising at least one height indicator according to claim 1.

13. The aircraft according to claim 12,
wherein the aircraft comprises at least one height sensor connected to the height indicator.

14. A height indicator for an aircraft, the height indicator comprising a controller controlling a display means, the controller and the display means being configured to display a height scale and a pointer,
wherein the height scale is able to move in relation to the pointer along an axis on the display means, the height scale being a piecewise linear scale, the piecewise linear scale comprising several graduated sections comprising graduations, each graduated section having its own linear scale, each graduated section having a scale factor different from a scale factor of another graduated section, each scale factor representing the quotient between a distance on the graduated section along the axis and a corresponding actual height, the several graduated sections comprising a low-height section having a first scale factor, the low-height section ranging from a reference height to a first height greater than the reference height, the several graduated sections comprising an intermediate-height section having a second scale factor, the second scale factor being less than the first scale factor, the intermediate-height section ranging from the first height to a second height greater than the first height;
wherein the controller and the display means are configured to position at least one symbol opposite the height scale, the at least one symbol being integral with the height scale, the at least one symbol comprising at least one of the following symbols: a landing decision height symbol representing a threshold landing decision height, a mission decision height symbol representing a mission height floor, an autopilot symbol representing an autopilot setpoint height; and
wherein, the at least one symbol comprising the landing decision height symbol and the mission decision height symbol representing a mission height floor, the controller and the display means are configured to position, in a second display zone of the display means separate from a first display zone displaying the height scale: a first mark when the current height is less than the mission height floor, and the first mark plus a second mark when the current height is less than the threshold landing decision height.

15. The height indicator according to claim 14,
wherein the height scale is able to move in translation on the display means, only a part of the height scale comprising a current height being displayed at each instant on the display means.

16. The height indicator according to claim 14,
wherein a low interval between two successive graduations of the low-height section represents an actual low height, and an intermediate interval between two successive graduations of the intermediate-height represents an actual intermediate height that is greater than the actual low height.

17. A height indicator for an aircraft, the height indicator comprising a controller controlling a display, the controller and the display configured to display a height scale and a pointer,
wherein the height scale and the pointer are able to move in relation to each other along an axis on the display, the height scale being a piecewise linear scale, the piecewise linear scale comprising two graduated sections comprising graduations, each graduated section having its own linear scale, each graduated section having a scale factor different from a scale factor of another graduated section, each scale factor representing the quotient between a distance on the graduated section along the axis and a corresponding actual height, the two graduated sections comprising a low-height section having a first scale factor, the low-height section ranging from a reference height to a first height greater than the reference height, the two graduated sections comprising an intermediate-height section having a second scale factor, the second scale factor being less than the first scale factor, the intermediate-height section ranging from the first height to a second height greater than the first height;
wherein the low-height section comprises major markers and minor markers of the graduations, the intermediate-height section having short markers and long markers of the graduations, the short markers being shaped differently to the minor markers.

18. The height indicator according to claim 17,
further comprising a high-height section having a third scale factor, the high-height section ranging from the second height to a third height, the third scale factor being less than the second scale factor, the second height being less than the third height.

19. The height indicator according to claim 18,
wherein the height scale comprises an ungraduated section beyond the third height.

20. The height indicator according to claim 17, wherein the height scale is able to move in translation on the display means, only a part of the height scale comprising a current height being displayed at each instant on the display means.

\* \* \* \* \*